(12) United States Patent
Varma et al.

(10) Patent No.: US 10,999,352 B1
(45) Date of Patent: May 4, 2021

(54) INTELLIGENT HASHING HUB

(71) Applicant: Bank of America Corporation, Charlotte, NC (US)

(72) Inventors: Jayachandra Varma, Irving, TX (US); Manu Kurian, Dallas, TX (US); Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/736,658

(22) Filed: Jan. 7, 2020

(51) Int. Cl.
| | |
|---|---|
| *G06F 15/173* | (2006.01) |
| *H04L 29/08* | (2006.01) |
| *H04L 29/06* | (2006.01) |
| *H04L 12/24* | (2006.01) |

(52) U.S. Cl.
CPC .......... *H04L 67/06* (2013.01); *H04L 63/0428* (2013.01); *H04L 67/101* (2013.01); *H04L 67/1023* (2013.01); *H04L 69/18* (2013.01); *H04L 41/16* (2013.01)

(58) Field of Classification Search
CPC ... H04L 67/06; H04L 63/0428; H04L 67/101; H04L 67/1023
See application file for complete search history.

(56) References Cited

U.S. PATENT DOCUMENTS

| | | |
|---|---|---|
| 7,464,143 B2 | 12/2008 | Pieper et al. |
| 8,117,274 B2 | 2/2012 | Schilders |
| 8,234,354 B2 | 7/2012 | Maruyama et al. |
| 8,914,482 B2 | 12/2014 | Petushkov et al. |
| 9,021,099 B2 | 4/2015 | Ko |
| 9,100,378 B2 | 8/2015 | Goto et al. |
| 10,009,412 B1 | 6/2018 | Gao et al. |
| 10,218,774 B2 | 2/2019 | Gao et al. |
| 10,225,321 B2 | 3/2019 | Gao et al. |
| 2005/0198261 A1 | 9/2005 | Durvasula et al. |
| 2005/0240943 A1 | 10/2005 | Smith et al. |
| 2009/0207835 A1* | 8/2009 | Lott ........................ H04L 45/74 370/352 |
| 2010/0269146 A1 | 10/2010 | Britt |
| 2012/0278878 A1 | 11/2012 | Barkie et al. |
| 2013/0133043 A1 | 5/2013 | Barkie et al. |
| 2016/0197885 A1 | 7/2016 | Cismas et al. |
| 2016/0197886 A1* | 7/2016 | Lapidous .......... H04L 29/06965 713/168 |
| 2016/0218935 A1* | 7/2016 | Cismas ............... H04L 43/0888 |
| 2017/0078384 A1 | 3/2017 | Trandafir et al. |
| 2018/0063288 A1 | 3/2018 | Cismas et al. |
| 2018/0349882 A1 | 12/2018 | White, III et al. |
| 2019/0007308 A1 | 1/2019 | Mandal et al. |
| 2019/0146950 A1 | 5/2019 | McElveen |

* cited by examiner

*Primary Examiner* — Thanh T Nguyen
(74) *Attorney, Agent, or Firm* — Banner & Witcoff, Ltd.; Michael A. Springs

(57) ABSTRACT

An intelligent hub for protocol-agnostic file transfer. The hub may include a transceiver, an interrogator processor, an intelligence engine processor, a data translation processor and a hashing processor. The hub may utilize artificial intelligence processes to perform real-time networking or file transfer protocol conversion.

20 Claims, 8 Drawing Sheets

INTELLIGENT HASHING HUB

TECHNICAL FIELD

Aspects of this disclosure generally relate networking systems. In particular, aspects of the disclosure relate to automatic network routing using an appropriate networking protocol.

BACKGROUND

Networked computer systems use various types of networking protocols, which are sets of standards/policies and formatting rules that facilitate communication between two or more devices over a network. In order to facilitate communication, both a sender and a recipient must be configured to use a given networking protocol. For example, a first business sending a collection of digital files to a second business should communicate using a same networking protocol. In many instances, manual intervention is used to ensure that this type of network communication can be accomplished. Currently, however, no device exists that can automatically accommodate data received using various different networking protocols and automatically convert the networking protocol to another protocol suitable for a destination device, using artificial intelligence processes.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure relates to an intelligent hub for protocol-agnostic file transfer, otherwise referred to as a protocol-agnostic file transfer apparatus. The apparatus may include a transceiver, an interrogator processor, an intelligence engine processor, a data translation processor and a hashing processor. The apparatus may utilize artificial intelligence processes to perform real-time (i.e., in-flight) networking or file transfer protocol conversion.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
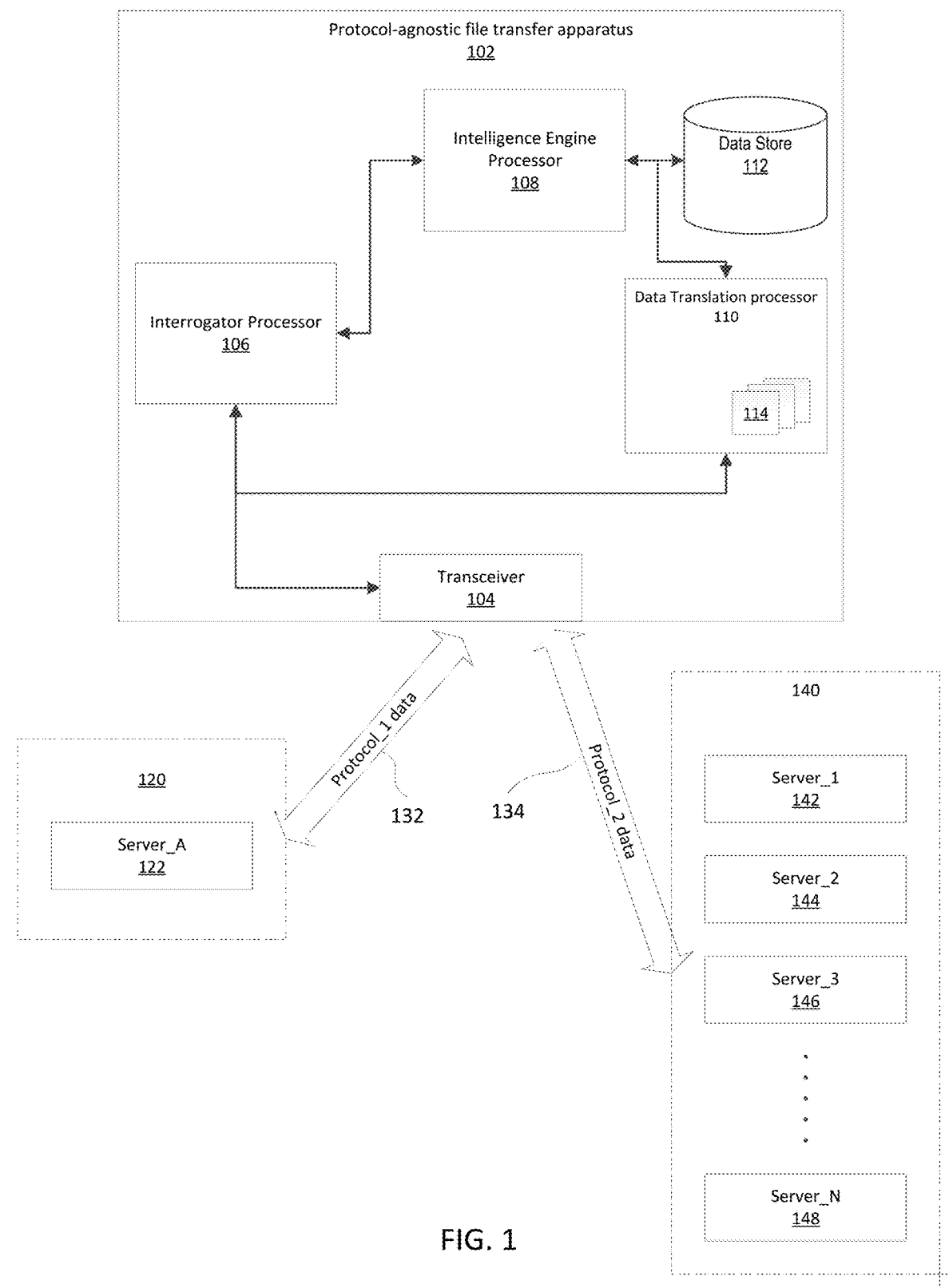
FIG. 1 schematically depicts a first implementation of a protocol-agnostic file transfer apparatus, according to one or more aspects described herein.

FIG. 1 schematically depicts a first implementation of a protocol-agnostic file transfer apparatus 102, according to one or more aspects described herein. The apparatus 102 may otherwise be referred to as a hub for protocol-agnostic file transfer 102, an intelligent hub for protocol-agnostic file transfer 102, or an in-flight data controller 102. In one example, data may be received from a first server, schematically depicted as Server_A 122 in FIG. 1. This Server_A 122 may be located virtually and/or physically within a remote environment 120. Accordingly, the remote environment 120 may be any server host location that is not controllable by the destination environment 140. In one specific example, the remote environment 120 may be a server site of a partner organization or company. In another example, the remote environment 120 may be a server site of an entity that has not interacted with the destination environment 140 previously, and thus may be classified as "unknown" source location. Generally, the remote environment 120 may be any networked computer or equivalent computing device that is capable of network communication with other computers. Further, the remote environment 120 may host a single or multiple servers of a single or a variety of different types, each of which may be capable of communicating using one or more networking protocols, otherwise referred to as transmission protocols. As such, Server_A 122 may be one of a large number of servers hosted within the remote environment 120. The Server_A 122 may be configured to communicate information across a network to a destination external to the environment 120. The Server_A 122 may be linked to a variety of network types, including, among others, a local area network (LAN), a wide area network (WAN), a cellular network, and/or the Internet. Additionally, the Server_A 122 may be configured to communicate information using one or more communication protocols, otherwise referred to a networking protocols. In addition, the one or more protocols used by the Server_A 122 may be configured to use one or more encryption processes. Examples of networking protocols that may be used with Server_A 122 include, among others TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). In one example, the Server_A 122 may be attempting to send data to a destination environment 140, schematically depicted as Protocol_1 data 132 in FIG. 1. In one example, this data stream may be intercepted by a protocol-agnostic file transfer apparatus 102. The protocol-agnostic file transfer apparatus 102 may be hosted within a same organization as the destination environment 140, or may be hosted separately by a separate organization. In one example, the apparatus 102 is implemented as a combination of hardware elements that are physically connected to the network across which the Server_A 122 is attempting to connect with the external environment 140. These hardware elements may be co-located, and may be integrated into a consolidated hardware package. In another example, one or more of the elements of the apparatus 102 may be distributed across different hardware devices.

The inbound Protocol_1 data 132 may be received by a transceiver element 104 of the apparatus 102. As such, the transceiver 104 may be implemented with the requisite hardware, firmware, and software configured to facilitate bidirectional communication across the network connecting the remote environment 120 to the destination environment 140. It is contemplated that any networking ports may be utilized in any of the descriptions of networking processes throughout this disclosure. In one example, the inbound data contained within the Protocol_1 data 132 may be passed from the transceiver 104 to the interrogator processor 106. The interrogator processor 106 may be configured to execute one or more processes to identify one or more characteristics of the data 132. These characteristics may include an identification of the sender/source of the data, which may identify the remote environment 120 and/or the Server_A 122. The characteristics of the data 132 may additionally include a desired destination for the data, which may correspond to the destination environment 140. Additionally, the characteristics of the data 132 may include an identification of a data transmission protocol used to send the data from the remote environment 120 to the protocol-agnostic file transfer apparatus 102. The interrogator processor 106 may be configured to identify additional information associated with the inbound data 132, including identification of intermediary servers or other network hardware elements through which the data passed as was communicated between the remote environment 120 and the apparatus 102.

The intelligence engine processor 108 may receive data from the interrogator processor 106 within the protocol-agnostic file transfer apparatus 102. The intelligence engine processor 108 may execute one or more processes on the data to select a destination server, from a list of one or more servers to which the apparatus 102 is connected. The one or more servers from which the destination server is selected may be located within the destination environment 140. In another example, the intelligence engine processor 108 may select a destination server from a list of servers distributed across multiple environments similar to destination environment 140. In one example, the intelligence engine processor 108 may select a destination server for the incoming data 132 by polling a data store 112. The data store 112 may include information on previous data transmission attempts to one or more servers within the destination environment 140. In certain examples, the data store 112 may contain information on polling attempts between the apparatus 102 and the servers of the destination environment 140. The polling attempts may be used to generate updated information on the status of one or more servers within the destination environment 140. In one example, the destination environment 140 contains servers 142-148. However, the destination environment 140 may contain any number of server computers, which may number in the hundreds, thousands or more. In another example, the intelligence engine processor 108 may select a destination server for the outgoing data 132 based upon real-time information received from one or more service of the destination environment 140. This real-time information may be transmitted periodically from the destination environment 142 the apparatus 102 in response to a periodic polling request from the apparatus 102 to one or more servers of the destination environment 140. In another example, one or more servers of the destination environment 140 may periodically transmit status information to the apparatus 102 without a request for information being received from the apparatus 102. In another example, the intelligence engine processor 108 may have access to real-time information about one or more servers of the destination environment 140 based upon intermittent status information communicated from the destination environment 140 to the apparatus 102. In yet another example, the intelligence engine processor 108 may utilize real-time information about the status of one or more servers within the destination environment 140 by sending a request for information to the one or more servers within the destination environment 140 upon receipt of incoming data 132 from the remote environment 120.

The data translation processor 110 may be configured to prepare the incoming data for transmission using a data transmission protocol that is appropriate for the destination server selected within the destination environment 140. Accordingly, the data translation processor 110 may be configured to convert data received using a first transmission protocol (Protocol_1 data 132) to a second transmission protocol (Protocol_2 data 134). The data translation processor 110 may be compatible with a wide range of data transmission protocols, and may be configured to format outgoing data 134 by utilizing a database of protocols 114 from which the data transmission processor 110 can select pertinent protocol rules associated with a selected protocol through which the data 134 will be communicated to the destination environment 140. In one example, the data translation processor 110 may select a data transmission protocol based upon an identification of a destination server within the destination environment 140. The identification of the destination server may be received from the intelligence engine processor 108. In another example, the transmission protocol to which the data translation processor 110 converts the outgoing data 134 is received as an instruction from the intelligence engine processor 108. In one example, the data translation processor 110 converts the networking protocol of the incoming data 132 in real-time. In another example, one or more buffers may be used to facilitate conversion of the data 132 received using a first networking protocol to outgoing data 134 using a second networking protocol.

The transceiver 104 may be configured to split the outgoing data 134 into one or more sub-portions for transmission across a network connection as Protocol_2 data 134. The transceiver 104 may split the outgoing data 134 based upon predetermined data transmission size rules applied for all destination servers, such as servers 142-148. In another example, the transceiver 104 may split the outgoing data 134 according to one or more transmission rules associated with a specific server to which the outgoing data 134 is being sent. Accordingly, the transceiver 104 may poll the data store 112 to determine one or more data size preferences/rules associated with a given data transmission protocol and destination server within the destination environment 140. It is contemplated that the transceiver 104 may split the outgoing data 134 into any number of sub-portions, groups, or packets of any size, without departing from the scope of these disclosures. It is also completed that the transceiver 104 may split the outgoing data into groups of a same size or different sizes. The transceiver 104 may also split outgoing data 134 according to real-time information received one or more servers of the destination environment 140.

In one example, Server_A 122 within the remote environment 120 may attempt to send data using networking protocol Protocol_1 132 to the destination environment 140. Specifically, the remote environment 120 may send the data 132 to a specific network address of the destination environment 140 and/or a specific network address of a specific server, from the servers 142-148, within the destination environment 140. It is contemplated that any type of networking addressing may be used with any of the innovations described throughout this disclosure. The protocol-agnostic file transfer apparatus 102 may intercept that data 132 before it is passed to the destination environment 140. As such, the apparatus 102 may redirect the data 132 to a different server within the destination environment 140, different to the server to which the data 132 was sent by the Server_A 122. This redirection of the data 132 by the protocol-agnostic file transfer apparatus 102 may be in response to a report from one or more of the servers 142-148 indicating to the apparatus 102 a limit of a storage capacity has been reached, is close to being reached, or that the servers are otherwise operating at a lower service level. The apparatus 102 may be configured to execute one or more load-balancing processes on the incoming data 132. As such, one or more of the servers 142-148 may be identical or substantially similar to one another, but the apparatus 102 a be configured to distribute the incoming data 132 across different servers, selected from the servers 142-148, in order to meet operational requirements. These operational requirements may include storage timeliness and accuracy. Specifically, the intelligence engine processor 108 may utilize a combination of historical and real-time information about one or more servers within the destination environment 140 and select one or more destination servers within the destination environment 140, based upon predicted or determined storage availability and/or processor availability at the selected server.

In one implementation, the intelligence engine processor 108 may be configured to utilize one or more artificial intelligence processes in order to, among others, selected destination servers for incoming data and assign a prioritization level to incoming data. It is contemplated that the intelligence engine processor 108 may utilize various forms of artificial intelligence. Other elements of the apparatus 102 may also utilize artificial intelligence processes. Accordingly, in one example, the intelligence engine processor 108 and/or additional elements of the protocol-agnostic file transfer apparatus 102 may utilize a system of machine learning and/or artificial intelligence to improve various determinations made the processor 108 and/or the additional elements of the protocol-agnostic file transfer apparatus 102, as explained in further detail below.

A framework for machine learning may involve a combination of one or more components, which may include three components: (1) representation, (2) evaluation, and (3) optimization components. Representation components refer to computing units that perform steps to represent knowledge in different ways, including but not limited to: as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, a machine learning engine may identify relationships between nodes that previously may have gone unrecognized, for example, using collaborative filtering techniques. This realization by the machine learning engine may increase the weight of a specific node; and subsequently spread weight to connected nodes. This may result in particular nodes exceeding a threshold confidence to push those nodes to an updated outcome from a Boolean false to a Boolean true. Other examples of machine learning techniques may be used in combination or in lieu of a collaborative filtering technique.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components may be manually tuned by to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system.

In some embodiments, one or more of the processes executed by the intelligence engine processor 108 may use a system of machine learning and/or artificial intelligence to improve accuracy of the determinations made by said processor 108. As explained herein, a framework for machine learning may involve a combination of supervised and unsupervised learning models.

Advantageously, while the servers 142-148 of the destination environment 140 may report networking protocol information and other status information (storage, processor utilization, among others) to the protocol-agnostic file transfer apparatus 102, the apparatus 102 may not communicate that information to the remote environment 120 that contains the Server_A 122. Accordingly, the protocol-agnostic file transfer apparatus 102 may serve to obfuscate the networking infrastructure of the destination environment 140 such that the sender of data 132 does not require and is not provided with information about the networking protocols utilized within the destination environment 140 or about the status of specific network elements (servers and other networking hardware, among others) within the destination environment 140. Further advantageously, the protocol-agnostic file transfer apparatus 102 facilitates network communication between the remote environment 120 and the destination environment 140 without requiring manual inputs to determine a suitable networking protocol to use between a server of the remote environment 120 and a server of the destination environment 140. In one example, the protocol-agnostic file transfer apparatus 102 facilitates high-frequency/high-speed network protocol and destination determination such that the incoming data 132 can be analyzed and routed within the destination environment 140 in real time. In certain examples, the data 132 may be arriving at the apparatus 102 at speeds of up to or over 100 gigabits per second (100 Gbit/s). Thus, the protocol-agnostic file transfer apparatus 102 may be configured with processor hardware capable of facilitating data flows at such data transfer rates. It is contemplated that the apparatus 102 may be used with data streams being transferred at any speeds, without departing from the scope of these disclosures. Further, the protocol-agnostic file transfer apparatus 102 may be configured to be connected to any network hardware type including any routing, bridge, modem and/or cabling types (e.g., CAT 3, CAT 5, CAT 5e, CAT 6, CAT 6a, CAT 7, CAT 8, RJ-45, among many others).

Figure 2:
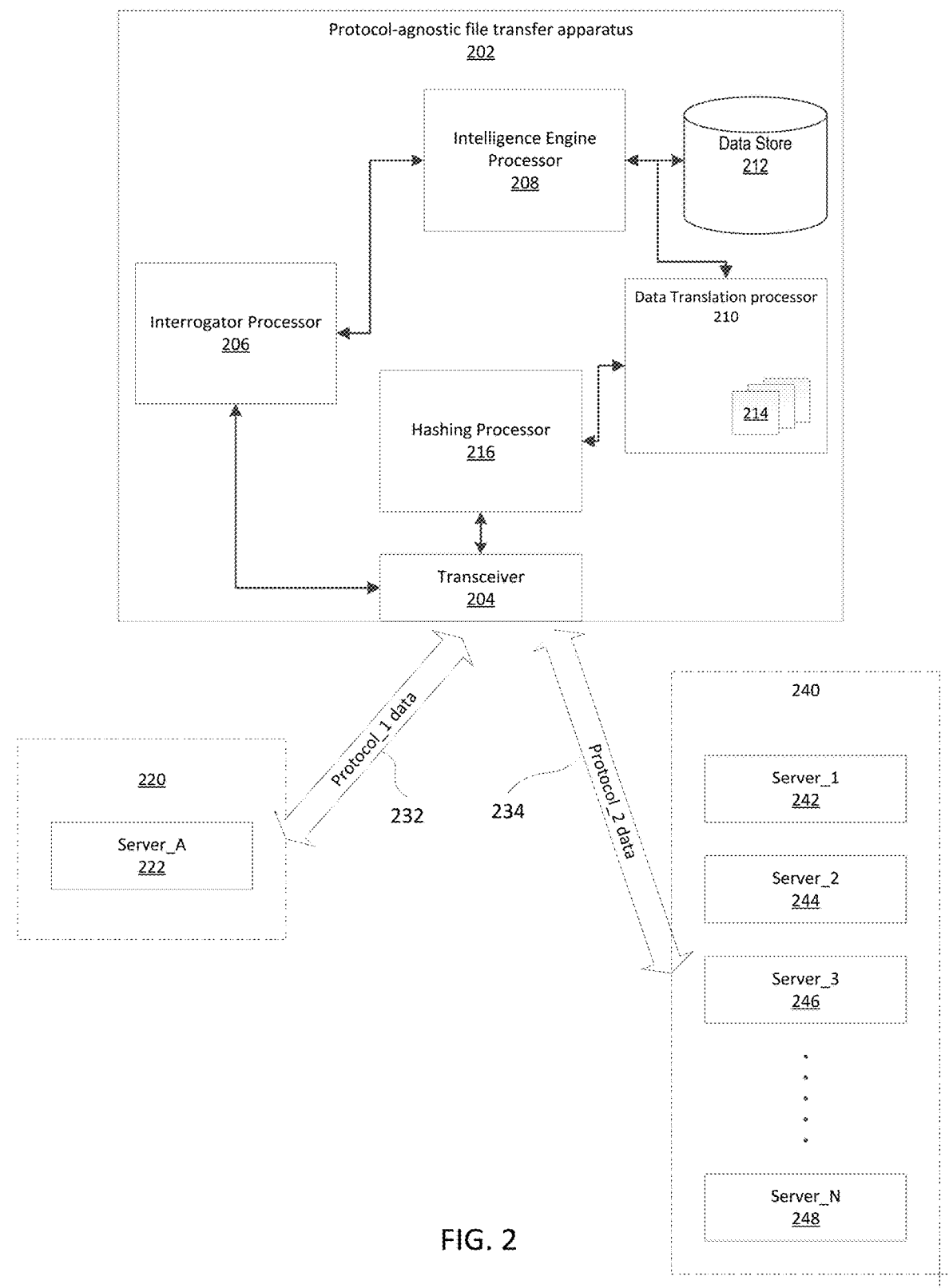
FIG. 2 schematically depicts another implementation of a protocol-agnostic file transfer apparatus, according to one or more aspects described herein.

FIG. 2 schematically depicts another implementation of a protocol-agnostic file transfer apparatus 202, according to one or more aspects described herein. Accordingly, the protocol-agnostic file transfer apparatus 202 may be similar to the protocol-agnostic file transfer apparatus 102 described in relation to FIG. 1. As such, an element in FIG. 2 may be considered to be similar to an element in FIG. 1 if those two elements share the same last two digits of the element label. For example, the interrogator processor 206 from FIG. 2 may be similar to the interrogator processor 106 from FIG. 1. In one example, the protocol-agnostic file transfer apparatus 202 may include a hashing processor 216. Accordingly, the protocol-agnostic file transfer apparatus 202 may otherwise be referred to as an intelligent hashing hub 202, or an intelligent hub for hashing protocol 202. This hashing processor 216 may receive data from the data translation processor 210, and may be configured to apply one or more hashing processes (which may be hashing algorithms) to the data prior to transmission using the transceiver 204 and across a network to the destination environment 240 using the Protocol_2 234. In certain examples, the hashing processor 216 is configured to apply multilevel hashing processes to the data prior to transmission to the destination environment 240. Additionally or alternatively, the hashing processor 216 may also be used to encrypt the data before being transmitted as Protocol_2 data 234. As such, the hashing processor 216 may be configured to apply/utilize one or more symmetric or asymmetric encryption processes. In another example, the data translation processor 210 may utilize an encrypted data transmission protocol that will be used to transmit the Protocol_2 data 234. The hashing processor 216 may apply an additional level of hashing to the encrypted data received at the hashing processor 216 from the data translation processor 210.

Figure 3:
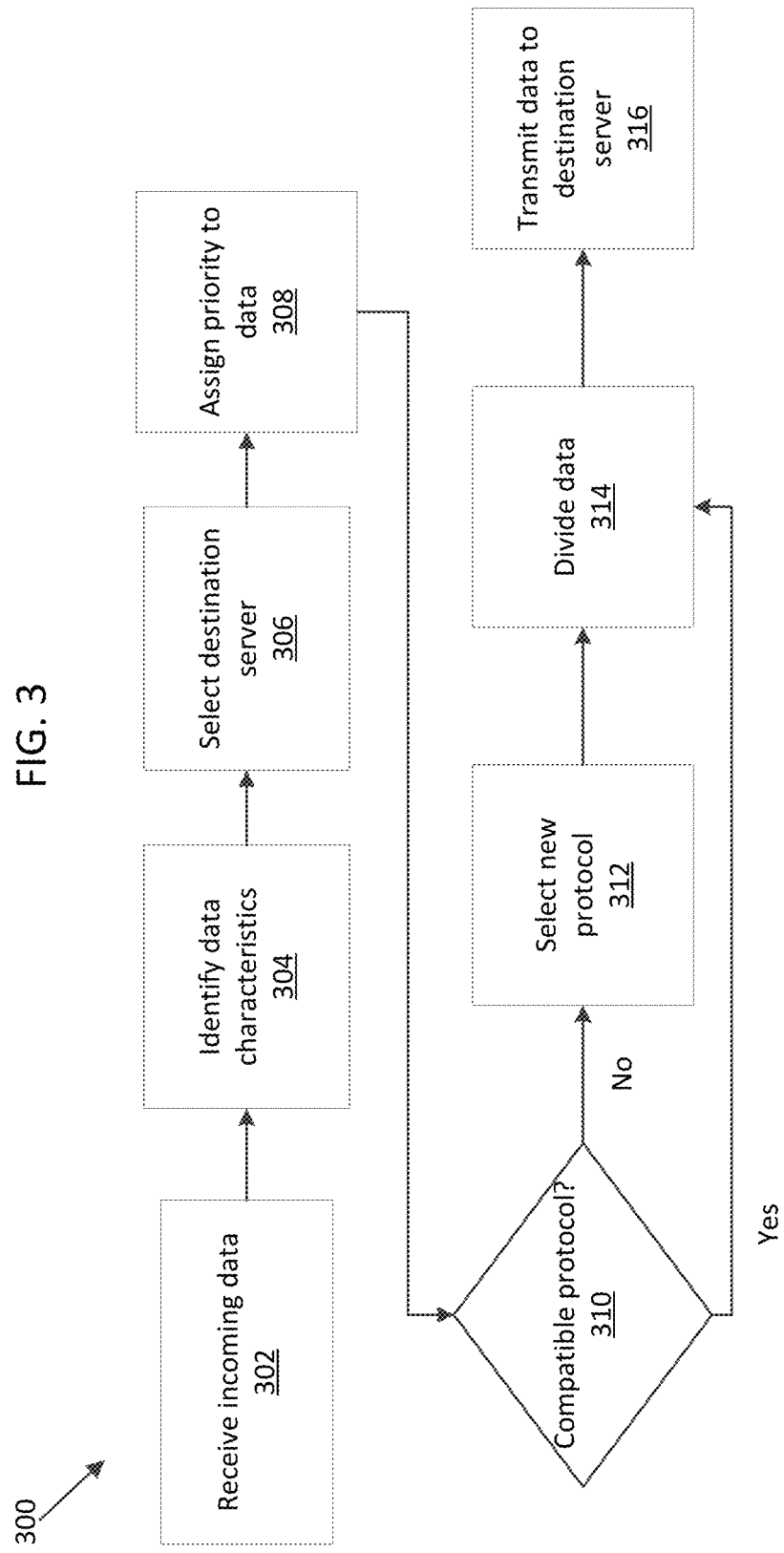
FIG. 3 is a flowchart diagram of one or more processes that may be executed by one or more of the elements of a protocol-agnostic file transfer apparatus, according to one or more aspects described herein.

FIG. 3 is a flowchart diagram 300 of one or more processes that may be executed by one or more of the elements of the protocol-agnostic file transfer apparatus 102, according to one or more aspects described herein. In one example, one or more processes of the flowchart 300 may be executed by the transceiver 104, the interrogator processor 106, the intelligence engine processor 108, and the data translation processor 110. In another example, one or more of the processes of flowchart 300 may be executed by a subset of these elements, or by a single element of the apparatus 102, without departing from the scope of these disclosures. One or more processes may be executed at block 302 to receive incoming data. These one or more processes may be, in one example, executed by the transceiver 104. As such, block 302 may include one or more error checking processes to determine that the network hardware and software between the remote environment 120 and the apparatus 102 is functioning within acceptable operating parameters.

One or more processes may be executed at block 304 to identify certain characteristics of incoming data to the protocol-agnostic file transfer apparatus 102. These one or more processes associated with block 304 may be executed by the interrogator processor 106. In one example, the one or more processes executed at block 304 may identify a networking protocol used to communicate the incoming data, a source of the data, and a desired destination of the data, among others. One or more destination servers may be selected at block 306 of flowchart 300. The one or more processes associated with the destination server selection 306 may be executed by the intelligence engine processor 108. In one example, the one or more processes associated with block 306 may be executed by the intelligence engine processor 108 using one or more machine learning and/or neural network processes to arrive at a destination server selection. As such, the intelligence engine processor 108 may select a destination server without requiring the incoming data to meet data characteristics requirements, and thereby the intelligence engine processor 108 may adapt to different types of data received from the remote environment 120. Block 308 may execute one or more processes to assign a priority level to incoming data. In one example, the intelligence engine processor 108 may execute the one or more processes to assign a priority level to the incoming data. As such, in one example, the intelligence engine processor 108 may assign a priority level to the incoming data based upon the data characteristics identified at block 304. Further, the priority level assigned to the incoming data at block 308 may be determined using multiple types of information about the incoming data, and may be accomplished using machine learning and/or neural network processes, as previously described in this disclosure.

One or more processes may be executed at decision block 310 to determine whether a networking protocol associated with incoming data 132 to the protocol-agnostic file transfer apparatus 102 is suitable for transmission to a selected destination server within the destination environment 140. These one or more processes executed to determine the suitability of a networking protocol associated with the incoming data 132 may be executed by the data translation processor 110. In one example, if the incoming data is being transmitted using a networking protocol that is not suitable for transmission to the selected destination server within destination environment 140, flowchart 300 may proceed to block 312, and a new data transmission protocol may be selected. These one or more processes to select a new networking protocol at block 312 may be executed by the data translation processor 110.

In one example, the outgoing data transmitted from the protocol-agnostic file transfer apparatus 102 to the destination environment 140 may be divided into two or more data blocks, groups or packets. One or more processes to divide the data may be executed at block 314 and may be executed by the transceiver 104. Further, one or more processes may be executed at block 316 to transmit the data from the protocol-agnostic file transfer apparatus 102 to a selected one or more servers within the destination environment 140. In one example, the one or more processes executed to transmit the data to the destination server may be executed at block 316, and may be executed by the transceiver 104.

Figure 4:
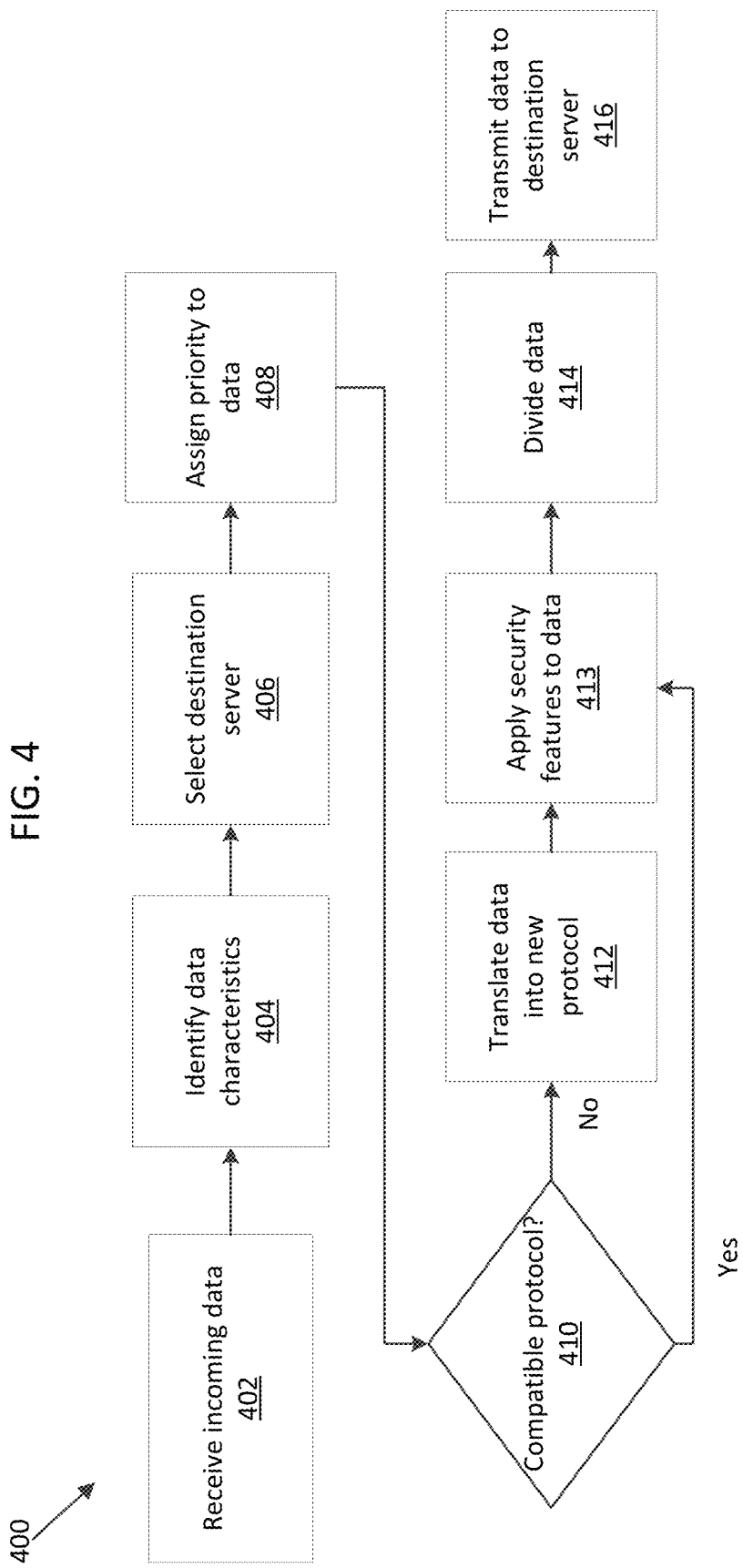
FIG. 4 is another flowchart diagram of one or more processes that may be executed by one or more of the elements of a protocol-agnostic file transfer apparatus, according to one or more aspects described herein.

FIG. 4 is another flowchart diagram 400 that includes elements similar to flowchart 300. As such, blocks with the same last two digits of their reference numbers in FIGS. 3 and 4 may include similar processes, and may be executed by similar elements of the prodigal-agnostic file transfer apparatus 102 or 202. For example, block 302 may be similar to block 402.

Flowchart 400 includes block 413, which applies one or more security features to the data. These one or more processes executed to apply one or more security features to the data at block 413 may be executed by the hashing processor 216. Accordingly, these one or more processes executed at block 413 may apply one or more hashing algorithms to the data. Additionally, block 413 may include the execution of one or more processes to encrypt the outbound data to be transmitted from the protocol-agnostic file transfer apparatus 102 to the destination environment 140.

Figure 5:
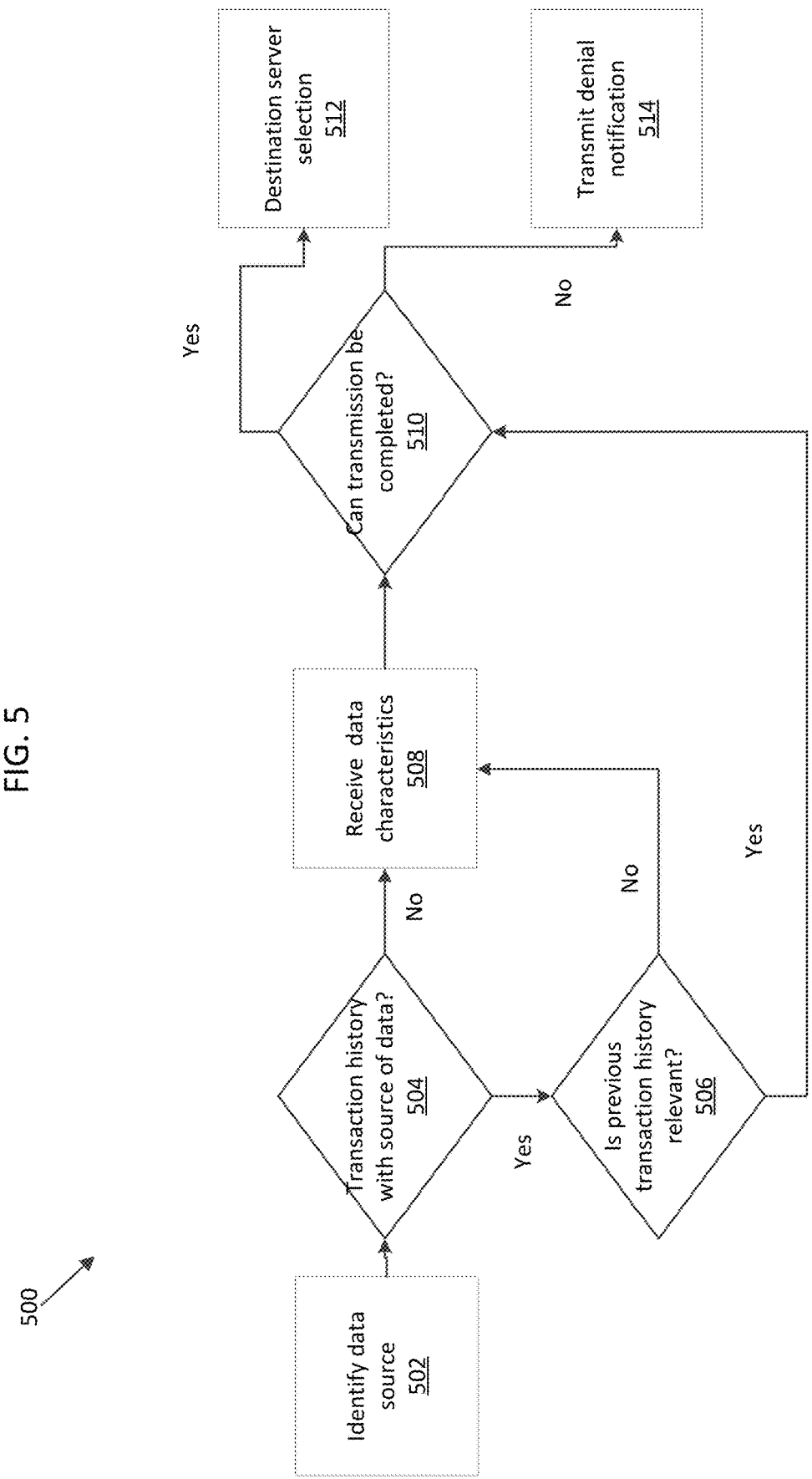
FIG. 5 is a flowchart diagram of a process that may be utilized to select a destination server for incoming data to a protocol-agnostic file transfer apparatus, according to one or more aspects described herein.

FIG. 5 is a flowchart diagram of a process 500 that may be utilized to select a destination server for incoming data to the protocol-agnostic file transfer apparatus 102. In one example, flowchart 500 may be executed by the intelligence engine processor 108 of the apparatus 102. Further, in one example, the flowchart 500 may expand upon the one or more processes executed at block 306 of the flowchart 300.

One or more processes may be executed at block 502 of flowchart 500 to identify a source of the data received by the apparatus 102. These one or more processes may identify the source based upon header information contained within the data, or based upon a physical data port at which the data is received, among others. One or more processes executed at decision block 504 may be used to determine whether the apparatus 102 has previously communicated with the data source. As such, the one or more processes executed at decision block 504 may search through a database that stores transaction history of communication between the apparatus 102 and multiple different data sources, similar to the remote environment 120. It is determined that the apparatus 102 has previously communicated with the data source, the flowchart 500 may proceed to decision block 506. At block 506, one or more processes may be executed to determine whether the stored transaction history is still relevant to the pending communication attempt between the remote environment 120 and the destination environment 140. These one or more processes executed at block 506 may base the determination on the age of the communication history with the remote environment 120. For example, if the remote environment 120 has not communicated with the destination environment 140 during a threshold period of time (i.e., the transaction history is out of date), the one or more processes executed at block 506 may determine that the transaction history with the remote environment 120 is no longer relevant, and the remote environment 120 should be treated as if it is a new data source. As such, if the apparatus 102 cannot find a history of data transactions/communications with the remote environment 120, or if the previous transaction history is no longer relevant, flowchart 500 may proceed to block 508. At block 508, the intelligence engine processor 108 may receive data characteristics gathered by the interrogator processor 106. Additionally, the one or more processes executed by the intelligence engine processor 108 at block 508 may include gathering data characteristics from additional data sources. The intelligence engine processor 108 may execute one or more machine learning and/or neural network processes to determine whether the transmission attempt from the remote environment 120 to the destination environment 140 can be completed. The one or more processes executed to determine if the transmission can be completed may be executed at decision block 510. Accordingly, if the transmission can be completed, flowchart 500 may proceed to block 512, and the intelligence engine processor 108 may select a destination server. If, however, the intelligence engine processor 108 determines that the transmission cannot be completed, flowchart 500 may proceed to block 514. At block 514, one or more processes may be executed to deny the transmission request between the remote environment 120 and the destination environment 140. In one example, the one or more processes executed at block 540 may include the transmission of a denial notification to the remote environment 120.

Figure 6:
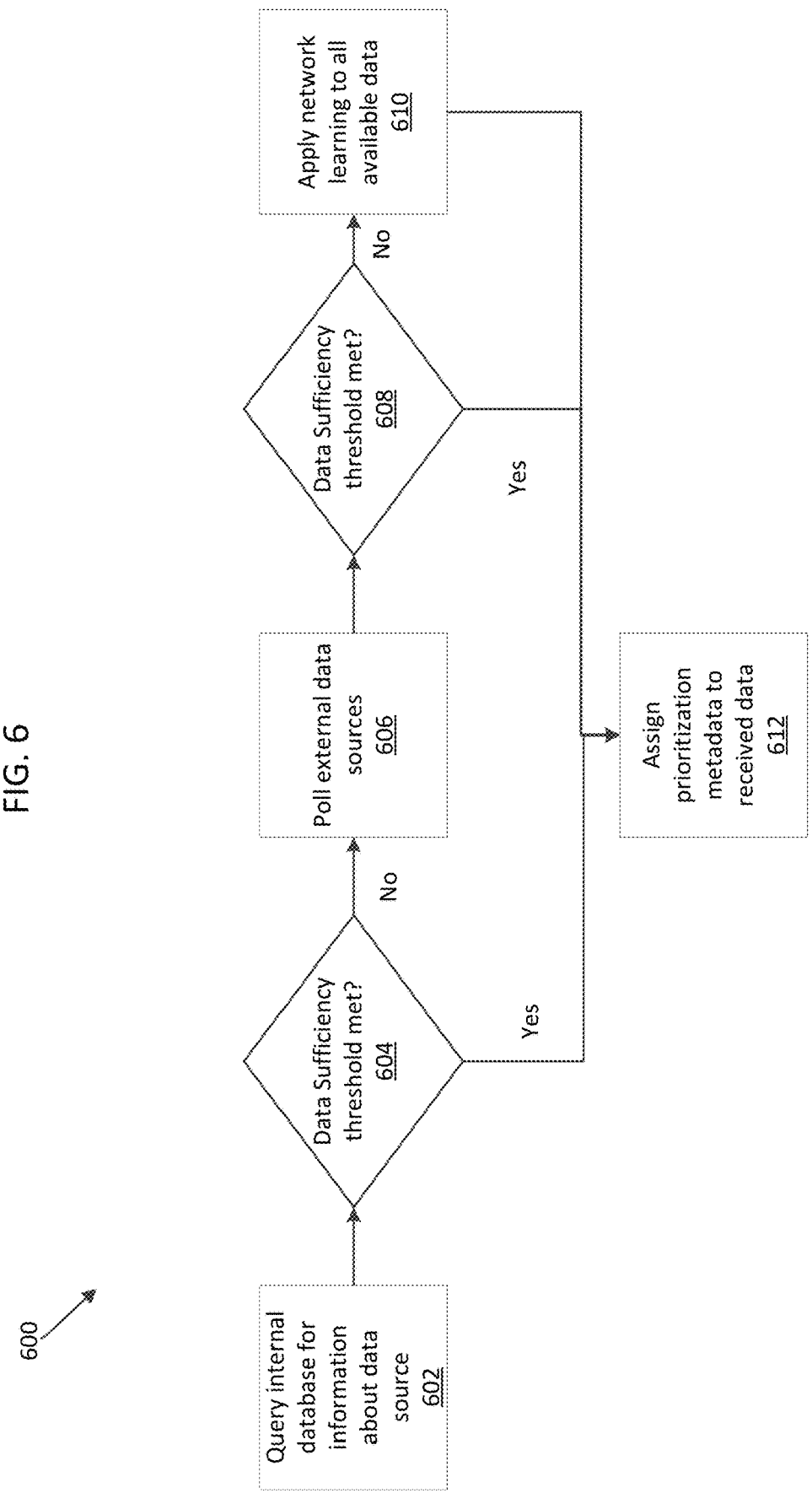
FIG. 6 is a flowchart diagram that may be executed by an intelligence engine processor, according to one or more aspects described herein.

FIG. 6 is a flowchart diagram 600 that may be executed by the intelligence engine processor 108, according to one or more aspects described herein. In one example, flowchart 600 may expand upon block 508 from FIG. 5. As such, at block 602, one or more processes may be executed to query a database that is internal to the apparatus 102 for information about the data source of the data received by the apparatus 102. In one example, this database may include information about the sender. This information about the sender may include information about the business entity associated with the sender. For example, the database may include information about the ownership status of the entity associated with the data received from the remote environment 120. For example, the intelligence engine processor 108 may determine from information received from an internal database that the sender of the data is a public or a privately held company. In addition, the intelligence engine processor 108 may receive information from an internal database about a company's plans to transition from being a privately held to being a publicly owned company, or vice versa. This plan information may include a timeline associated with the transition from being a private to a public company. As such, the intelligence engine processor 108 may determine a status of data received from the remote environment 120 based upon a time of receipt of the data, and compare that time of receipt to a timeline associated with a company's plans to transition from being privately to being publicly owned. Additionally, the one or more processes executed at block 602 may query an internal database for information about the sensitivity of the data received from the remote environment 120. For example, the intelligence engine processor 108 may receive from an internal database an indication that the received data from the specific sender is likely to contain sensitive data that should be provided with additional security measures, such as encryption.

Decision block 604 may execute one or more processes to determine whether the information received at block 602 is sufficient to determine a prioritization level associated with the receive data. In one example, the intelligence engine processor 108 may not assign a prioritization level to the received data unless a sufficient amount of information is known about the source of the data and the likely content of the data. If the internal database does not contain sufficient information about the receive data, flowchart 600 may proceed to block 602. At block 606, one or more processes may be executed by the intelligence engine processor 108 to poll data sources external to the apparatus 108 for information about the receive data. In one example, these polling processes may search external (including public) databases for information about the ownership status of an entity associated with the receive data, and/or a likely sensitivity of the receive data, among others. These external databases may be accessible via the Internet. In response to receipt of the data from the external data sources at block 606, flowchart 600 may proceed to decision block 608. Accordingly, at decision block 608, one or more processes may be executed to determine whether a sufficient amount of data has been received to assign a prioritization level to the receive data. If, at block 608, it is determined that an insufficient amount of data has been received and a data sufficiency threshold has not been met, the flowchart 600 may proceed to block 610. At block 610, one or more processes may be executed to apply one or more neural network processes to all information available on the data received from the remote environment 120. In one example, these one or more processes executed at block 610 may default to assigning a high prioritization level to the receive data. For example, a high prioritization level may assume that the received data is not publicly available and contain sensitive information. One or more processes to assign prioritization metadata to the received data may be executed at block 612. It is contemplated that any metadata structure type may be used, without departing from the scope of these disclosures.

Figure 7:
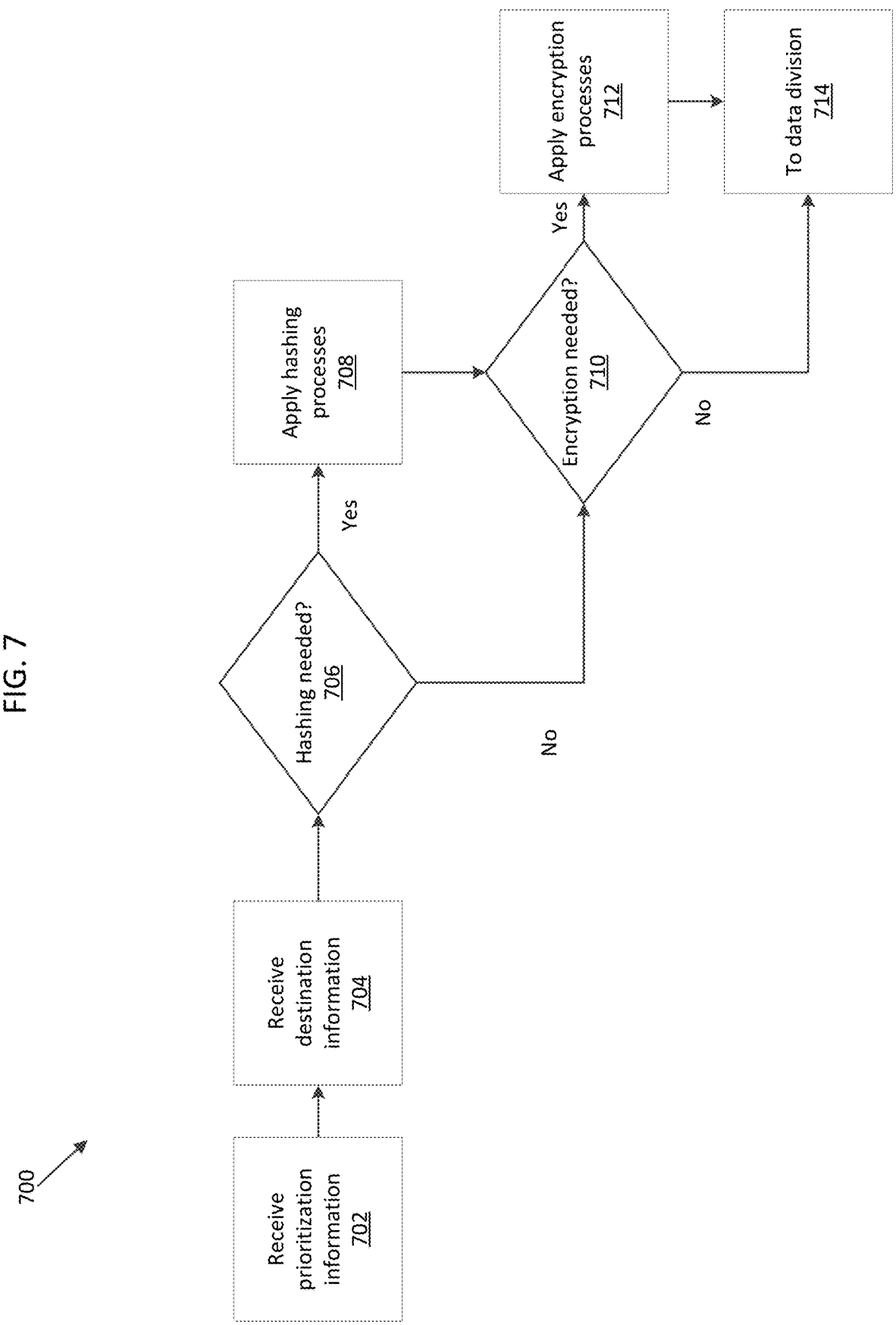
FIG. 7 depicts a flowchart diagram that may be used to apply one or more security processes to data received by a protocol-agnostic file transfer apparatus, according to one or more aspects described herein.

FIG. 7 depicts a flowchart diagram 700 that may be used to apply one or more security processes to data received by the protocol-agnostic file transfer apparatus 102, according to one or more aspects described herein. In one example, one or more of the processes associated with flowchart 700 may be executed by the hashing processor 216. A prioritization level may be received at block 702. In one example, this prioritization level may be the prioritization associated with block 612 of flowchart 600. At block 704, one or more processes may be executed to receive destination information associated with received data. This destination information may include a destination server within the destination environment 140. Decision block 706 may execute one or more processes to determine whether a hashing algorithm should be applied to the receive data. This determination may consider the prioritization level associated with the data, and the destination of the data. For example, all data may be hashed prior to being sent to one or more specific destination servers. In another example, data that has been signed a prioritization level above a certain threshold is hashed prior to being sent to a selected server within the destination environment 140. If required, the one or more hashing processes may be executed at block 708. These one or more hashing processes may include a single level or a multilevel hashing algorithm, among others. In addition, the hashing processor 216 maybe configured to apply one or more encryption processes to the receive data. These one or more encryption processes may be in addition to one or more encrypted networking protocols utilized by the apparatus 102. One or more processes may be executed at decision block 710 to determine whether one or more levels of encryption should be applied to the receive data. In one example, decision block 710 may consider the prioritization level associated with the received data and/or the intended destination of the data. Accordingly, if the data is to be encrypted, the flowchart 700 may proceed to block 712. It is contemplated that one or more encryption processes executed at block 712 may be applied to data in addition to or as an alternative to one or more hashing processes executed at block 708. The flowchart 700 may proceed to block 714, and the data may be sub-divided for final transmission to the selected destination server within the destination environment 140.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

As previously discussed, the various elements described throughout this disclosure may be implemented as standalone hardware elements, or as a combination of hardware, firmware, and software components. For example, each of the elements of FIG. 1 and FIG. 2 may be implemented as standalone hardware elements embodied as application-specific integrated circuits or similar hardware elements. In another example, two or more of the elements of FIG. 1 and FIG. 2 may be combined together and implemented as dedicated hardware elements. In yet another example, one or more elements of FIG. 1 and FIG. 2 may be implemented as firmware and/or software modules. Further, one or more of the elements of FIG. 1 and FIG. 2 may be embodied using a general-purpose or specialized computing system, such as computing system 800 from FIG. 8.

Figure 8:
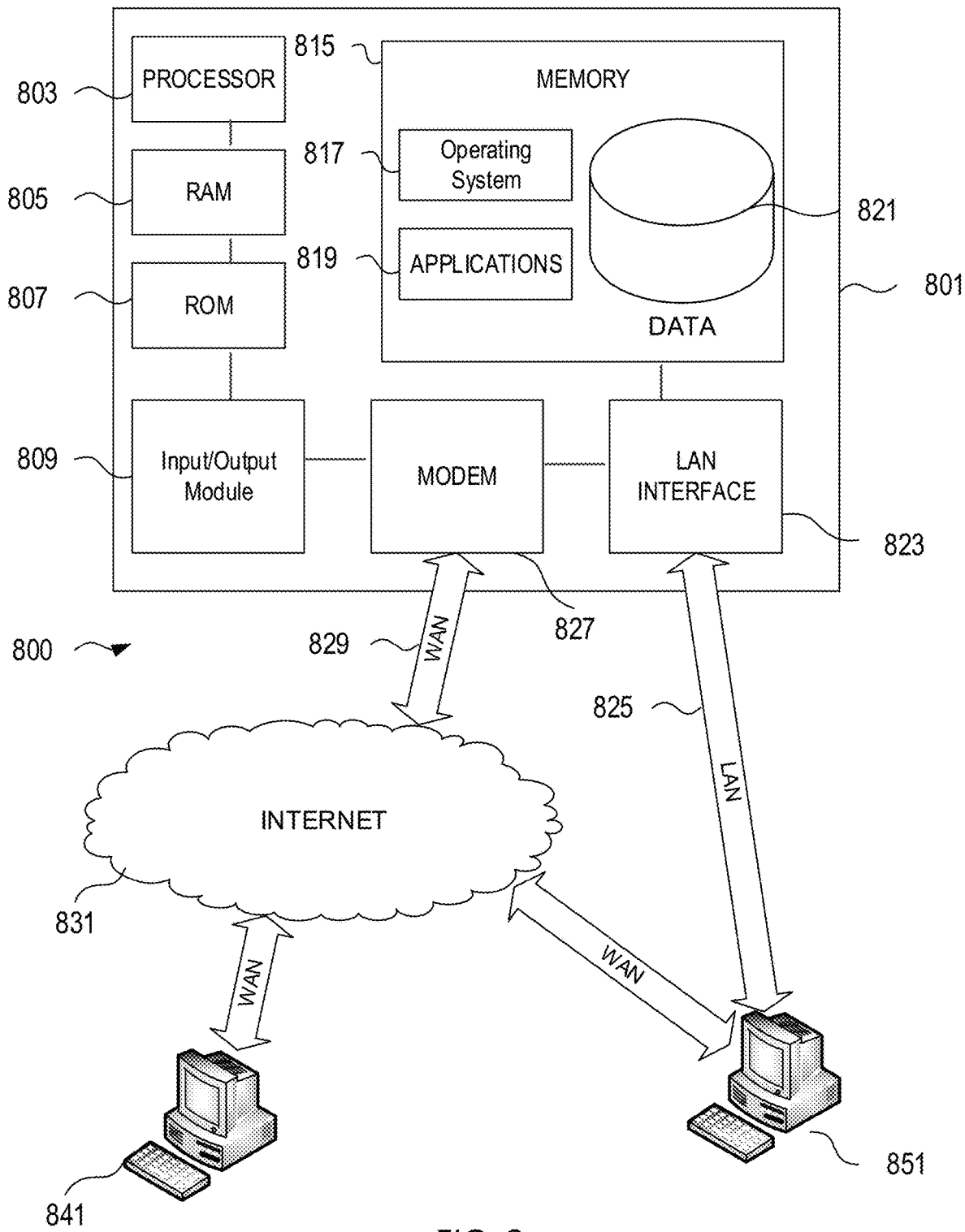
FIG. 8 shows an illustrative operating environment in which various aspects of the disclosure may be implemented, according to one or more aspects described herein.

As such, the protocol-agnostic file transfer apparatus 102, or one or more of the modules of the apparatus 102 may be implemented as one or more network-linked computer devices, such as device 801 from FIG. 8. Thus, the protocol-agnostic file transfer apparatus 102 may be implemented on consolidated computing hardware, such as computing device 801, at a single geographic location, and/or on a single integrated circuit, and the like. In another example, the protocol-agnostic file transfer apparatus 102 may be implemented across multiple computing devices at a common, or dispersed geographic locations. In one example, the device 801 may be in communication with devices 841 and 851 using one or more networking technologies (825, 829, and/or 831) described in further detail in the description that follows.

In one example implementation, computing device 801 may have a processor 803 for controlling overall operation of device 801 and its associated components, including RAM 805, ROM 807, an input/output (I/O) module 809, and memory 815. In one example, as will be apparent to those of ordinary skill in the art, memory 815 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 815 may comprise a non-transitory computer-readable medium that may communicate instructions to processor 803 to be executed.

I/O module 809 may include a microphone, keypad, touch screen, and/or stylus through which a user of the computing device 801 may provide input, and may also include one or more of a speaker for providing audio output and a video display device for providing textual, audiovisual and/or graphical output. Software may be stored within memory 815 and/or storage to provide instructions to the processor 803 for allowing the computing device 801 to perform various functions. For example, memory 815 may store software used by the computing device 801, such as an operating system 817, application programs 819, and an associated database 821. The processor 803 and its associated components may allow the computing device 801 to run a series of computer-readable instructions to process and format data.

The computing device 801 may operate in a networked environment supporting connections to one or more remote computers, such as computing devices 841 and 851. In one example, the computing devices 841 and 851 may be personal computers or servers that include many, or all, of the elements described above relative to the computing device 801. Specifically, the computing device 841 may represent one or more elements of the remote environment 120 and computing device 851 may represent one or more elements of the destination environment 140. Alternatively, computing device 841 and/or 851 may be a data store that is affected by the operation of the computing device 801. The network connections depicted in FIG. 8 include a local area network (LAN) 825 and a wide area network (WAN) 829, but may also include other networks. When used in a LAN networking environment, the computing device 801 is connected to the LAN 825 through a network interface or adapter 823. When used in a WAN networking environment, the computing device 801 may include a modem 827 or other means for establishing communications over the WAN 829, such as the Internet 831. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 801, 841, and/or 851 may be wired or wireless, and may utilize Wi-Fi, a cellular network, Bluetooth, infrared communication, or an Ethernet cable, among many others.

An application program 819 used by the computing device 801 according to an illustrative embodiment of the disclosure may include computer-executable instructions for invoking functionality related to a protocol-agnostic file transfer apparatus 102. The computing device 801 and/or the other devices 841 or 851 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the artificial intelligence processes executed by the protocol-agnostic file transfer apparatus 102 are configured to intelligently select a destination server and perform in-flight network protocol conversion. As such, the present disclosure reduces the need for manual intervention into setting up a file transfer process between two networked systems. Additionally, the present disclosure includes an apparatus, such as apparatus 102, that allows certain details of a destination network to be private not broadcasted/made available to external entities (e.g., another company). For example, the apparatus 102 allows a destination environment 140 to communicate with a remote environment 120 without the remote environment 120 needing to know what networking protocols are used by the destination environment 140.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes a protocol-agnostic file transfer apparatus that includes a transceiver that is configured to receive data as incoming data transmitted using a first data transmission protocol. The transceiver may be configured to split the data into one or more groups, and send the one or more groups as outgoing data using a second transmission protocol. The protocol-agnostic file transfer apparatus may additionally include an interrogator processor that is configured to identify characteristics of the incoming data received by the transceiver. The characteristics may include an identification of a first transmission protocol, information about the sender, and information about the intended recipient of the data. The protocol-agnostic file transfer apparatus may additionally include an intelligence engine processor that is configured to select a destination server, from a list of one or more destination servers, to which the outgoing data is to be transmitted. The destination server may be selected based upon a combination of real-time status information and historical data received from at least one of the list of one or more destination servers. The intelligence engine processor may also be configured to assign a priority to the incoming data by analyzing the sender information, the requested recipient information, and a time at which the incoming data is received. The protocol-agnostic file transfer apparatus may additionally include a data translation processor, which is configured to translate the data into a second data transmission protocol. The second transmission protocol may be selected based upon the selected destination server. The transceiver may split the data into one or more groups based upon real-time status information and historical data received from the destination server.

In one implementation, the transceiver of the protocol-agnostic file transfer apparatus may prevent a sender of the incoming data from receiving information about the second data transmission protocol and the destination server.

In another implementation the intelligence engine processor may use machine learning artificial intelligence to select the destination server.

In one implementation, the intelligence engine processor may determine a server rank for at least one server of the plurality of destination servers.

The intelligence engine processor may determine a server rank for at least one server of a list of possible destination servers, based on a likelihood that the at least one server has a capacity to receive new data, a historical average communication bandwidth, a historical average communication latency, and/or a level of security associated with the server.

The intelligence engine may assign a priority to incoming data by determining a likelihood that the incoming data is publicly available at the time at which the incoming data is received, based upon the sender identification.

The transceiver may be configured to process an encryption handshake for incoming data transmitted using the first transmission protocol.

The intelligence engine processor may be configured to select two or more destination servers, such that a first destination server is sent a first portion of the incoming data using a second transmission protocol, and a second destination server is sent a second portion of the incoming data using a third transmission protocol. The second and third transmission protocols may be a same or different transmission protocols.

A protocol-agnostic file transfer apparatus may include a processor, a non-transitory computer-readable medium comprising computer-executable instructions that when executed by the processor are configured to receive incoming data transmitted using a first transmission protocol. The instructions may additionally be configured to identify characteristics of the incoming data, with the characteristics including identification of the first data transmission protocol, an identification of the sender, and an identification of the requested recipient. The instructions may additionally select a destination server, selected from one or more destination servers, to which the outgoing data is to be transmitted. The destination server may be selected based upon a combination of real-time status information and historical data received from at least one of the one or more possible destination servers. A prioritization may be assigned to the incoming data by analyzing the sender identification, the requested recipient identification, and a time at which the incoming data was received. The data may be translated into a second data transmission protocol, such that the second transmission protocol may be selected based upon the destination server. The data may be split into one or more groups based upon real-time status information and historical data received from the destination server. The instructions may additionally send the one or more groups of data as outgoing data using a second transmission protocol.

The non-transitory computer-readable medium may comprise computer-executable instructions that are further configured to prevent a sender of the incoming data from receiving information about the second transmission protocol and the destination server. Additionally, a destination server may be selected using machine learning artificial intelligence processes.

A server rank for at least one server of a list of possible destination servers may be determined based upon: a likelihood that the at least one server has capacity to receive new data, a historic average communication bandwidth of the at least one server, a historical average communication latency associated with the at least one server, and a level of security associated with the server.

A prioritization level may be assigned to the incoming data by determining a likelihood that the incoming data is publicly available at the time at which the incoming data is received, based upon an identification of the sender.

The non-transitory computer-readable medium may comprise computer-executable instructions configured to process an encryption handshake for incoming data transmitted using the first data transmission protocol.

The non-transitory computer-readable media may comprise computer-executable instructions that are configured to select two destination servers, such that a first portion of the incoming data is sent to a first destination server using a second transmission protocol, and a second destination server is sent a second portion of the incoming data using a third transmission protocol.

A method for protocol-agnostic file transfer may include receiving incoming data transmitted using a first data transmission protocol, identifying a plurality of characteristics of the incoming data, including identification of the first transmission protocol, a sender identification, and a requested recipient identification. The method may additionally include selecting a destination server, from a group of destination servers, to which outgoing data is to be transmitted. The destination server may be selected based upon a combination of real-time status information and historical data received from one of the list of destination servers. A priority may be assigned to the incoming data by analyzing the sender's identification, the requested recipient identification, and a time at which the incoming data is received. The method may translate the data into a second transmission protocol, and the second transmission protocol may be selected based upon the selected destination server. The method may additionally split the data into one or more groups based upon real-time status information and historical data received from the destination server. The method may additionally send the one or more groups as outgoing data using the second data transmission protocol.

The method may prevent a sender of incoming data from receiving information about a second data transmission protocol and a destination server.

The method may additionally use machine learning artificial intelligence to select a destination server.

The method may determine a server rank for at least one server of a list of destination servers, based upon at least one of a likelihood that the at least one server has capacity to receive new data, a historical average communication bandwidth, a historical average communication latency, and a level of security associated with the server.

A priority may be assigned to incoming data by determining a likelihood that the incoming data is publicly available at the time at which the incoming data is received, based upon an identification of the sender.

The method may additionally process an encryption handshake for incoming data transmitted using the first data transmission protocol.

In another aspect, this disclosure includes a protocol-agnostic file transfer apparatus that includes a transceiver that is configured to receive data as incoming data transmitted using a first data transmission protocol. The transceiver may be configured to split the data into one or more groups, and send the one or more groups as outgoing data using a second transmission protocol. The protocol-agnostic file transfer apparatus may additionally include an interrogator processor that is configured to identify characteristics of the incoming data received by the transceiver. The characteristics may include an identification of a first transmission protocol, information about the sender, and information about the intended recipient of the data. The protocol-agnostic file transfer apparatus may additionally include an intelligence engine processor that is configured to select a destination server, from a list of one or more destination servers, to which the outgoing data is to be transmitted. The destination server may be selected based upon a combination of real-time status information and historical data received from at least one of the list of one or more destination servers. The intelligence engine processor may also be configured to assign a priority to the incoming data by analyzing the sender information, the requested recipient information, and a time at which the incoming data is received. The protocol-agnostic file transfer apparatus may additionally include a data translation processor, which is configured to translate the data into a second data transmission protocol. The second transmission protocol may be selected based upon the selected destination server. The protocol-agnostic file transfer apparatus may also include a hashing processor that is configured to apply a multi-layer hashing processor algorithm to the outgoing data before being transmitted to the destination server. The transceiver may split the data into one or more groups based upon real-time status information and historical data received from the destination server.

In one implementation, the hashing processor is configured to establish an encrypted connection using a second transmission protocol.

A protocol-agnostic file transfer apparatus may include a processor, a non-transitory computer-readable medium comprising computer-executable instructions that when executed by the processor are configured to receive incoming data transmitted using a first transmission protocol. The instructions may additionally be configured to identify characteristics of the incoming data, with the characteristics including identification of the first data transmission protocol, an identification of the sender, and an identification of the requested recipient. The instructions may additionally select a destination server, selected from one or more destination servers, to which the outgoing data is to be transmitted. The destination server may be selected based upon a combination of real-time status information and historical data received from at least one of the one or more possible destination servers. A prioritization may be assigned to the incoming data by analyzing the sender identification, the requested recipient identification, and a time at which the incoming data was received. The data may be translated into a second data transmission protocol, such that the second transmission protocol may be selected based upon the destination server. The data may be split into one or more groups based upon real-time status information and historical data received from the destination server. A multi-layer hashing processes may be applied to the outgoing data before being transmitted to the destination server. The instructions may additionally send the one or more groups of data as outgoing data using a second transmission protocol.

A method for protocol-agnostic file transfer may include receiving incoming data transmitted using a first data transmission protocol, identifying a plurality of characteristics of the incoming data, including identification of the first transmission protocol, a sender identification, and a requested recipient identification. The method may additionally include selecting a destination server, from a group of destination servers, to which outgoing data is to be transmitted. The destination server may be selected based upon a combination of real-time status information and historical data received from one of the list of destination servers. A priority may be assigned to the incoming data by analyzing the sender's identification, the requested recipient identification, and a time at which the incoming data is received. The method may translate the data into a second transmission protocol, and the second transmission protocol may be selected based upon the selected destination server. The method may additionally split the data into one or more groups based upon real-time status information and historical data received from the destination server. Additionally, a multi-layer hashing processes may be applied to the outgoing data before being transmitted to the destination server. The method may additionally send the one or more groups as outgoing data using the second data transmission protocol.

Accordingly, it will be understood that the invention is not to be limited to the embodiments disclosed herein, but is to be understood from the following claims, which are to be interpreted as broadly as allowed under the law.

What is claimed is:

1. A protocol-agnostic file transfer apparatus comprising:
    a transceiver configured to receive data as incoming data transmitted using a first data transmission protocol, split the data into one or more groups, and send the one or more groups as outgoing data using a second data transmission protocol;
    an interrogator processor configured to identify a plurality of characteristics of the incoming data received by the transceiver, wherein the plurality of characteristics include an identification of the first data transmission protocol, a sender identification, and a requested recipient identification;
    an intelligence engine processor configured to:
        select a destination server, selected from a plurality of destination servers, to which the outgoing data is to be transmitted, wherein the destination server is selected based upon a combination of real-time status information and historical data received from at least one of the plurality of destination servers;
        assign a priority to the incoming data by analyzing the sender identification, the requested recipient identification, and a time at which the incoming data is received, and
    a data translation processor, configured to translate the data into the second data transmission protocol, wherein the second transmission protocol is selected based upon the destination server; and
    a hashing processor, configured to apply a multi-layer hashing process to the outgoing data before transmission to the destination server,
    wherein the transceiver splits the data into one or more groups based upon real-time status information and historical data received from the destination server.

2. The protocol-agnostic file transfer apparatus of claim 1, wherein the hashing processor is further configured to establish an encrypted connection using the second data transmission protocol.

3. The protocol-agnostic file transfer apparatus of claim 1, wherein the transceiver prevents a sender of the incoming data from receiving information about the second data transmission protocol and the destination server.

4. The protocol-agnostic file transfer apparatus of claim 1, wherein the intelligence engine processor utilizes machine learning artificial intelligence to select the destination server.

5. The protocol-agnostic file transfer apparatus of claim 3, wherein the intelligence engine determines a server rank for at least one server of the plurality of destination servers, based upon a likelihood that the at least one server has capacity to receive new data, a historical average communication bandwidth, a historical average communication latency, and a level of security associated with the server.

6. The protocol-agnostic file transfer apparatus of claim 1, wherein the intelligence engine assigns the priority to the incoming data by determining a likelihood that the incoming data is publically available at the time at which the incoming data is received, based upon the sender identification.

7. The protocol-agnostic file transfer apparatus of claim 1, wherein the transceiver is further configured to process an encryption handshake for the incoming data transmitted using the first data transmission protocol.

8. A protocol-agnostic file transfer apparatus comprising:
    a processor;
    a non-transitory computer-readable medium comprising computer-executable instructions that when executed by the processor are configured to:
        receive incoming data transmitted using a first data transmission protocol;
        identify a plurality of characteristics of the incoming data, wherein the plurality of characteristics include an identification of the first data transmission protocol, a sender identification, and a requested recipient identification;
        select a destination server, selected from a plurality of destination servers, to which outgoing data is to be transmitted, wherein the destination server is selected based upon a combination of real-time status information and historical data received from at least one of the plurality of destination servers;
        assign a priority to the incoming data by analyzing the sender identification, the requested recipient identification, and a time at which the incoming data is received;

translate the data into a second data transmission protocol, wherein the second transmission protocol is selected based upon the destination server;

split the data into one or more groups based upon real-time status information and historical data received from the destination server;

apply a multi-layer hashing process to the outgoing data before transmission to the destination server; and send the one or more groups as outgoing data using the second data transmission protocol.

9. The protocol-agnostic file transfer apparatus of claim 8, further comprising establishing an encrypted connection using the second data transmission protocol.

10. The protocol-agnostic file transfer apparatus of claim 8, wherein the non-transitory computer-readable medium comprises computer-executable instructions that when executed by the processor are further configured to: prevent a sender of the incoming data from receiving information about the second data transmission protocol and the destination server.

11. The protocol-agnostic file transfer apparatus of claim 8, wherein the non-transitory computer-readable medium comprises computer-executable instructions that when executed by the processor are further configured to utilize machine learning artificial intelligence to select the destination server.

12. The protocol-agnostic file transfer apparatus of claim 10, wherein the non-transitory computer-readable medium comprises computer-executable instructions that when executed by the processor are further configured to determine a server rank for at least one server of the plurality of destination servers, based upon a likelihood that the at least one server has capacity to receive new data, a historical average communication bandwidth, a historical average communication latency, and a level of security associated with the server.

13. The protocol-agnostic file transfer apparatus of claim 8, wherein the priority is assigned to the incoming data by determining a likelihood that the incoming data is publically available at the time at which the incoming data is received, based upon the sender identification.

14. The protocol-agnostic file transfer apparatus of claim 8, wherein the non-transitory computer-readable medium comprises computer-executable instructions that when executed by the processor are further configured to process an encryption handshake for the incoming data transmitted using the first data transmission protocol.

15. A method for protocol-agnostic file transfer, comprising:

receiving incoming data transmitted using a first data transmission protocol;

identifying a plurality of characteristics of the incoming data, wherein the plurality of characteristics include an identification of the first data transmission protocol, a sender identification, and a requested recipient identification;

selecting a destination server, selected from a plurality of destination servers, to which outgoing data is to be transmitted, wherein the destination server is selected based upon a combination of real-time status information and historical data received from at least one of the plurality of destination servers;

assigning a priority to the incoming data by analyzing the sender identification, the requested recipient identification, and a time at which the incoming data is received;

translating the data into a second data transmission protocol, wherein the second transmission protocol is selected based upon the destination serve;

splitting the data into one or more groups based upon real-time status information and historical data received from the destination server;

applying a multi-layer hashing process to the outgoing data before transmission to the destination server; and sending the one or more groups as outgoing data using the second data transmission protocol.

16. The method of claim 15, further comprising establishing an encrypted connection using the second data transmission protocol.

17. The method of claim 15, further comprising: preventing a sender of the incoming data from receiving information about the second data transmission protocol and the destination server.

18. The method of claim 15, further comprising: utilizing machine learning artificial intelligence to select the destination server.

19. The method of claim 17, further comprising: determining a server rank for at least one server of the plurality of destination servers, based upon a likelihood that the at least one server has capacity to receive new data, a historical average communication bandwidth, a historical average communication latency, and a level of security associated with the server.

20. The method of claim 15, wherein the priority is assigned to the incoming data by determining a likelihood that the incoming data is publically available at the time at which the incoming data is received, based upon the sender identification.

* * * * *

UNITED STATES PATENT AND TRADEMARK OFFICE
CERTIFICATE OF CORRECTION

PATENT NO. : 10,999,352 B1  
APPLICATION NO. : 16/736658  
DATED : May 4, 2021  
INVENTOR(S) : Varma et al.

Page 1 of 1

It is certified that error appears in the above-identified patent and that said Letters Patent is hereby corrected as shown below:

In the Claims

Column 24, Line 21:
In Claim 15, delete "serve;" and insert --server;--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*